United States Patent [19]

Anderson et al.

[11] Patent Number: 4,552,432
[45] Date of Patent: Nov. 12, 1985

[54] HYBRID CABLE

[75] Inventors: Gene S. Anderson, Elburn; David B. Watson, Batavia, both of Ill.

[73] Assignee: Cooper Industries, Inc., Houston, Tex.

[21] Appl. No.: 487,094

[22] Filed: Apr. 21, 1983

[51] Int. Cl.$^4$ .................................................. G02B 5/16
[52] U.S. Cl. ................................ 350/96.23; 174/70 R; 174/106 R; 174/108
[58] Field of Search .................... 350/96.23; 174/70 R, 174/70 S, 70 A, 102 R, 103, 105 R, 106 R, 107, 108, 126 CP

[56] References Cited

U.S. PATENT DOCUMENTS

| 2,212,360 | 8/1940 | Aken | 174/116 |
|---|---|---|---|
| 2,886,631 | 5/1959 | Muller | 174/105 |
| 3,259,684 | 7/1966 | Wakefield | 174/36 |
| 3,261,907 | 7/1966 | Morrison | 174/115 |
| 3,286,022 | 11/1966 | Hvizd, Jr. | 174/105 |
| 3,355,544 | 11/1967 | Costley et al. | 174/106 |
| 3,584,139 | 6/1971 | Swanson | 174/103 |
| 3,602,632 | 8/1971 | Ollis | 174/36 |
| 3,644,659 | 2/1972 | Campbell | 174/27 |
| 3,649,744 | 3/1972 | Coleman | 174/107 |
| 3,660,590 | 5/1972 | Conam | 174/47 |
| 3,737,557 | 6/1973 | Verne et al. | 174/23 R |
| 3,766,307 | 10/1973 | Andrews, Jr. | 174/47 |
| 3,800,066 | 3/1974 | Whitfill, Jr. et al. | 174/116 |
| 3,829,603 | 8/1974 | Hansen et al. | 174/115 |
| 3,865,466 | 2/1975 | Slaughter | 350/96 B |
| 3,903,354 | 9/1975 | Dageforde | 174/107 |
| 4,006,289 | 2/1977 | Roe et al. | 174/102 |
| 4,017,579 | 4/1977 | Roe et al. | 264/174 |
| 4,072,398 | 2/1978 | Lareen et al. | 350/96.23 |
| 4,117,448 | 9/1978 | Siems | 340/15.5 TS |
| 4,147,406 | 4/1979 | Anderson | 350/96.23 |
| 4,148,560 | 4/1979 | Margolis | 350/96.23 |
| 4,156,104 | 5/1979 | Mondello | 174/70 R |
| 4,157,452 | 6/1979 | Pignataro et al. | 174/36 |
| 4,166,670 | 9/1979 | Ramsay | 350/96.23 |
| 4,169,657 | 10/1979 | Bedard | 350/96.23 |
| 4,185,887 | 1/1980 | Ferrentino | 350/96.23 |
| 4,188,088 | 2/1980 | Andersen et al. | 350/96.23 |
| 4,191,448 | 3/1980 | Dean et al. | 350/96.23 |
| 4,195,906 | 4/1980 | Dean et al. | 350/96.23 |
| 4,197,423 | 4/1980 | Fusen | 174/107 |
| 4,199,224 | 4/1980 | Oestreich | 350/96.23 |
| 4,225,749 | 9/1980 | Pierre et al. | 174/107 |
| 4,227,770 | 10/1980 | Gunn | 350/96.23 |
| 4,256,921 | 3/1981 | Bahder | 174/107 |
| 4,271,350 | 6/1981 | Crowley | 219/549 |
| 4,272,155 | 6/1981 | Slaughter | 350/96.23 |
| 4,312,566 | 1/1982 | Jackson | 350/96.23 |
| 4,342,500 | 8/1982 | Oestreich et al. | 350/96.23 |
| 4,359,598 | 11/1982 | Dey et al. | 350/96.23 |
| 4,365,865 | 12/1982 | Stiles | 350/96.23 |
| 4,392,714 | 7/1983 | Brüggendieck et al. | 350/96.23 |

FOREIGN PATENT DOCUMENTS

| 42996 | 1/1982 | European Pat. Off. | 350/96.23 |
|---|---|---|---|
| 2728658 | 1/1979 | Fed. Rep. of Germany | 350/96.23 |
| 3112422 | 10/1982 | Fed. Rep. of Germany | 350/96.23 |
| 2481812 | 11/1981 | France | 350/96.23 |
| 2029048 | 3/1980 | United Kingdom | 350/96.23 |

*Primary Examiner*—William L. Sikes
*Assistant Examiner*—Frank González
*Attorney, Agent, or Firm*—Fitch, Even, Tabin & Flannery

[57] ABSTRACT

A hybrid cable of substantially uniform cross section throughout its length for concurrently carrying optical signals and electrical signals. The cable includes a high strength central section and a section surrounding the central section and including a plurality of electrical conductors. The central section includes a pair of high strength members engaging one another with each having a metallic core and a resilient sleeve. The central section further includes at least one optical conductor having an optically conductive core and a resilient sleeve with the optical conductor engaging both of the strength members and extending substantially to the periphery of the central section. Geophones can be connected to the electrical conductors at spaced locations intermediate the ends of the cable without interference with components of the central section.

8 Claims, 2 Drawing Figures

HYBRID CABLE

BACKGROUND OF THE INVENTION

The present invention relates to cables and, more particularly, to a hybrid cable for concurrently carrying optical signals and electrical signals.

Seismic surveying is commonly employed to evaluate the feasibility of oil exploration at a candidate site. One method of such surveying includes the manual deployment of an array of geophones connected at spaced locations along a cable network, to measure the reflections of the acoustic waves to an event such as detonation of an explosive charge. The geophysical cable used has a large count of twisted pairs of conductors (e.g., 126), one pair for each geophone, for carrying signals from the geophones to central processing equipment. The use of this system is limited by the need for manhandling the cable because the cable is heavy and bulky due to the large number of conductors, and because each conductor pair is dedicated to a respective geophone.

An improvement in this surveying method involves the use of a number of serially connected cable segments each having a limited number of twisted pairs (seven, for example). At the end of each cable segment, the analog signals from the respective twisted pairs are converted by an analog to digital converter and combined by multiplexer means into a pulse train carried by other conductors in the cable. Thus the twisted pairs in the next cable segment can be connected to other geophones. The cables used are much smaller and lighter, and the number of geophones is limited not by the cable, but only by the capabilities of the digital electronics used in the system. The cable segments are placed in series along the ground with the entire array of interconnected cable segments called a "spread". As the surveying advances in a predetermined direction, the spread must be moved along the ground. Often, particularly where the terrain is rugged, this movement is accomplished by unskilled hand labor. Thus it is desired that the cable segments be as light as possible. A recording truck is used to carry the processing equipment and it may be connected into the spread at random at any convenient location. It is of course unavoidable that the truck will occasionally run over the cable and it must have sufficient strength to withstand the crushing forces.

Attempts to develop a suitable cable for use in the improved method have not been entirely satisfactory. Cables using all metallic conductors and hybrid cables having both metallic conductors and optical conductors have been suggested. Optical conductors are preferred for carrying digital signals. Since the optical conductors have a greater bandwidth, a higher data transmission rate can be achieved. The great temperature range in which seismic surveying is conducted, as in hot deserts (where the temperature can reach 120 degrees Fahrenheit) and cold arctic (where the temperature can fall to minus 70 degrees Fahrenheit) and the unavoidably rough handling of the cable and equipment place especially stringent requirements on the cable. It was found necessary in first using the improved method to employ a cable having triple redundant optical conductors, because incidents of optical conductor breakage were unacceptably high. Of course, the use of a triple redundant system requires complex electronics, such as a majority vote circuit, to accept signals on any two out of three optical conductors as representing the valid signal. Reference may be made to U.S. Pat. No. 4,117,448 for a description of such prior geophysical prospecting arrays and systems and their manner of operation.

SUMMARY OF THE INVENTION

Among the several objects of the present invention may be noted the provision of an improved hybrid cable including both electrical and optical conductors; the provision of such a cable which permits connection of geophones to its twisted pairs without interference from its optical conductors and strength members, and which maintains the structural integrity of a central cable section including the optical conductors during that connection; the provision of such a cable which uses the strength members not only to provide tensile strength but also to protect the optical conductors from damage due to impact, and, furthermore, to temperature stabilize the cable; and the provision of such a cable which is flexible, rugged and reliable in use, has long service life, and is simple and economical to manufacture. Other objects and features of the present invention will be in part apparent and in part pointed out hereinafter in the specification and attendant claims.

Briefly, the hybrid cable of the present invention comprises a high strength central section including at least one fiber optic conductor and a section surrounding the central section and including a plurality of electrical conductors. The central section includes a pair of high strength members engaging one another with each having a metallic core and a resilient sleeve. The central section further includes at least one optical conductor having an optically conductive core and a resilient sleeve with the optical conductor engaging both of the strength members and extending substantially to the periphery of the central section. Geophones can be connected to be electrical conductors at spaced locations intermediate the ends of the cable without interference with components of the central section.

BRIEF DESCRIPTION OF THE DRAWINGS

Like reference characters indicate corresponding components throughout the drawings.

DESCRIPTION OF THE PREFERRED EMBODIMENT

Figure 1:
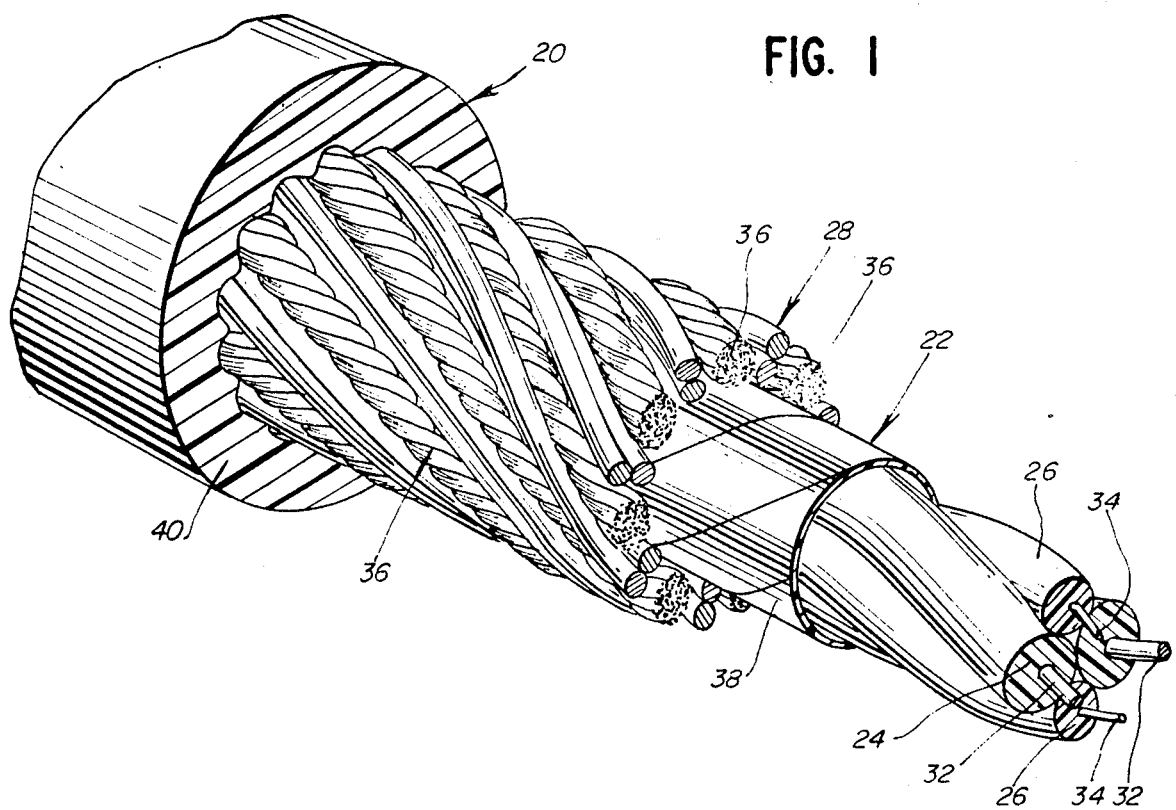
FIG. 1 illustrates, in an enlarged scale, a length of hybrid cable of the present invention with components of the cable removed to show underlying layers and elements.

Referring to the drawings, a hybrid cable for concurrently carrying optical signals and electrical signals is generally indicated by reference numeral 20. The cable has a substantially uniform cross section throughout its length and comprises a high strength central section 22 including a pair of high strength members 24 engaging one another. Each member 24 has a core 32 of stranded steel and a sleeve of thermoplastic rubber which is soft and resilient over a broad temperature range, such as ELEXAR 84312 (a registered trademark of the Shell Oil Co.). Central section 22 also comprises at least one optical conductor 26 comprising a commercially available glass fiber assembly core 34 and a resilient sleeve formed of, preferably, the same thermoplastic rubber as the strength member sleeves. The fiber assembly has a glass fiber center for transmitting light, a glass cladding for reflecting light back into the glass fiber center, and an ultraviolet cured acrylate sleeve, applied at the time of manufacture of the glass and cladding, for mechanical protection of the glass. The optical conductor 26 engages both strength members and extends substantially to the periphery of the central section. As an example of the relative sizes of the components of the central section, the rubber sleeve applied to the fiber assembly "cat whisker" brings the optical conductor to an outer diameter of 0.9 millimeter. The diameter of each steel core 32 is 0.5 millimeter and the outside diameter of strength member 24 is 1.4 millimeters.

The cable 20 also has an electrical conductor section 28 surrounding the central section 22 and including a plurality of copper conductors each having a thin lacquer insulating coating. The conductors are arranged in twisted pairs 30 to enable electrical equipment such as geophones, to be connected at spaced locations intermediate the ends of the cable 20 without interference with the components of the central section. While seven twisted pairs 30 are shown in section 28, it will be appreciated that this number is somewhat arbitrary. Section 28 could accommodate more or fewer pairs depending of the requirements of a particular application. Adjacent twisted pairs are spaced by fillers 36 made of fiberglass chosen for its non-wicking characteristics. If additional water blockage is required, the central section 22 and the electrical conductor section 28 can be packed with a grease-type material. Cable 20 has an outer jacket 40 of polyurethane which offers high crush and abrasion resistance and is flexible over a wide range of temperatures. The conductors in the twisted pairs are preferably 28 gauge. Fillers 36 have an outside diameter of approximately 0.9 millimeters, and the outside diameter of cable 20 is about 6.8 millimeters.

Figure 2:
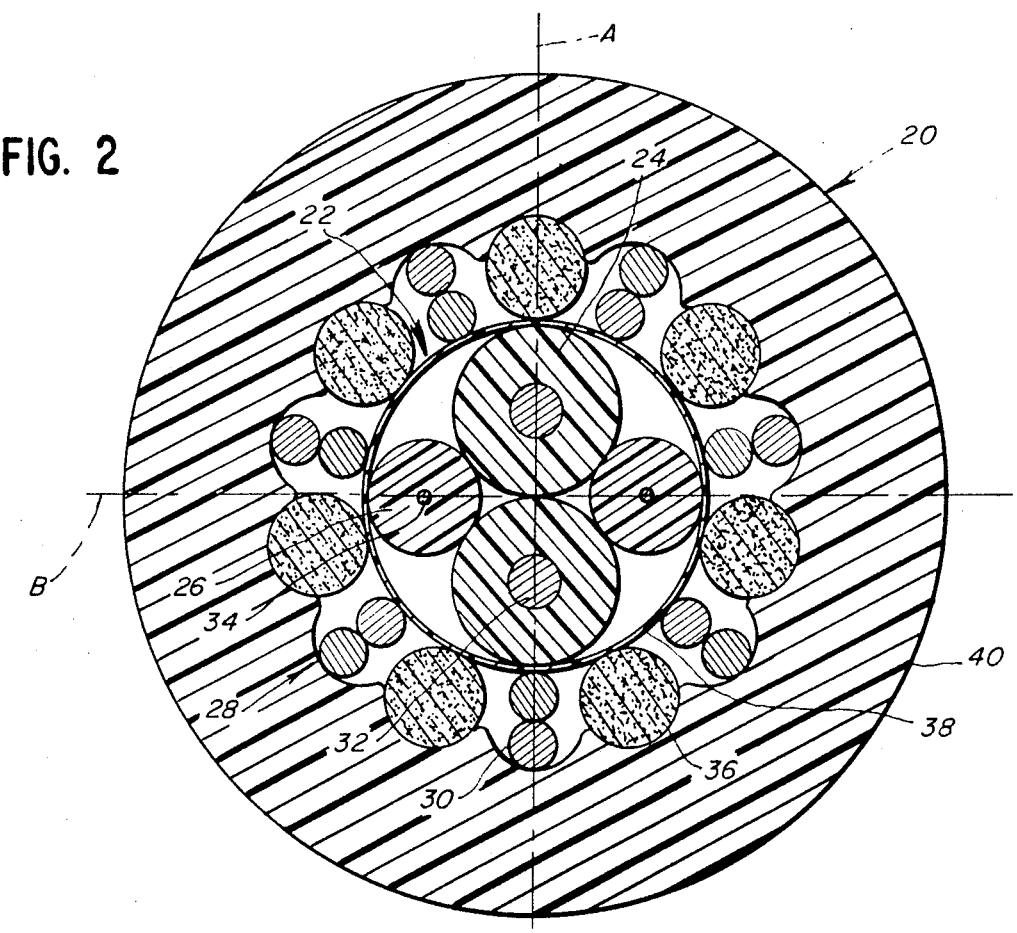
FIG. 2 is a transverse cross-sectional view of the cable of FIG. 1.

Referring to FIG. 2, the drawing is somewhat stylized to show the components clearly. In actual use, material from fillers 36 will migrate and partially fill the interstices of the pairs 30 which have a slight twist to give the pairs some immunity to 60 cycle hum. Fillers 36 are used to keep pairs 30 in place and maintain a generally circular cross section, making manufacture of the cable easier. Seated in the interstices of the strength members 24 are two optical conductors 26. Depending on the requirements of the surveying system, it would be possible to use a single optical conductor. In such case, a dummy, like a filler 36, can be used to give the central section a generally circular cross section for ease of manufacture of the cable central and appropriate stress distribution. The central section 22 is generally symmetrical about a first plane "A" intersecting the steel cores 32, and also is generally symmetrical about a second plane "B" intersecting the glass cores 34, with planes "A" and "B" being normal to one another.

The intimate relationship of the strength members and the optical conductors results in a triple function for the former. Besides providing the tensile strength necessary for pulling the cable along the ground, the strength members serve to recess, cushion and cradle the optical conductors 26 and thereby protect them from impact and crushing forces. As clearly shown in FIG. 2, the central section 22 includes a pair of optical conductors 26 each of which is cradled by the strength members 24. The configuration also offers stability over a wide range of temperatures because, while the thermal coefficient of expansion of glass is far exceeded by that of plastic, the thermal coefficients of expansion of glass and steel are closely matched. But for the presence of the steel, a dramatic drop in temperature as the diurnal changes in the desert, would cause the plastic to shrink, effecting bending of the glass fiber with consequent light attenuation. The steel strands act as columns in compression to prevent compression of the cable and avoid such substantial optical attenuation.

Each strength member 24 and each optical conductor 26 is preferably of generally circular cross section, and the four are cabled or twisted together for flexibility. The configuration of the four is generally round and the periphery is spirally wrapped with polyester tape 38, such as Mylar (a registered trademark of E. I. DuPont de Nemours and Company) to give the central section added structural integrity when the twisted pairs are being connected.

A standard 660 meter length of prior art cable having a 126 count of twisted pairs, weighs 183 kilograms and has a diameter of 13.3 millimeters. In comparison, the same length of the cable of the present invention weighs less than 28 kilograms and is only 6.2 millimeters in diameter.

In view of the above, it will be seen that the several objects of the present invention are achieved and other advantageous results attained.

As various changes could be made in the above constructions without departing from the scope of the present invention, it is intended that all matter contained in the above description shall be interpreted as illustrative and not in a limiting sense.

What is claimed is:

1. A hybrid cable of substantially uniform cross section throughout its length for concurrently carrying optical signals and electrical signals, said cable comprising:
    a high strength central section including a pair of high strength members engaging one another, each said member having a metallic core with a resilient sleeve thereabout, said central section further including at least one optical conductor having an optically conductive core with a resilient sleeve thereabout, said optical conductor engaging both of said strength members and extending substantially to the periphery of said central section;
    a surrounding section including a plurality of electrical conductors surrounding said central section; and
    an outer jacket formed of insulating material of the type having crush and abrasion resistance whereby electrical equipment can be connected to said electrical conductors at spaced locations intermediate the ends of said cable without interference from components of said central section.

2. A cable set forth in claim 1 wherein said central section comprises a pair of said optical conductors, said strength members and said optical conductors each having a generally circular cross section, said central section being generally symmetrical about a first plane interesecting the cores of said strength members and also being generally symmetrical about a second plane intersecting the cores of said optical conductors with said planes being normal to one another.

3. A cable set forth in claim 1 wherein the surrounding section includes a plurality of twisted pairs of electrical conductors disposed at spaced locations around the periphery of said central section.

4. A cable set forth in claim 3 wherein adjacent twisted pairs are separated by a filler.

5. A cable as set forth in claim 1 wherein said central section has a tape wrapping to give the central section added structural integrity.

6. A hybrid cable of substantially uniform cross section throughout its length for concurrently carrying optical signals and electrical signals, said cable comprising:

a high strength central section including a pair of high strength members engaging one another, each member having a metallic core, said central section further including a pair of optical conductors each cradled by said strength members with said conductors spaced from one another by said strength members, said optical conductors each having an optically conductive core and at least each optical conductor having a resilient sleeve abouts its core, each of said optical conductors engaging both of said strength members and extending substantially to the periphery of said central section;

a section including a plurality of electrical conductors surrounding said central section whereby electrical equipment can be connected to said electrical conductors at spaced locations intermediate the ends of said cable without interference with components of said central section; and a tape wrapping engaging said strength members and said conductors to increase the structural integrity of said central section.

7. A cable as set forth in claim 6 wherein each strength member has a resilient sleeve thereabout, said cable having an outer jacket formed of insulating material of the type having crush and abrasion resistance.

8. A hybrid cable of substantially uniform cross section throughout its length for concurrently carrying optical signals and electrical signals, said cable comprising:

a high strength central section including a pair of high strength members engaging one another and each having a core, said central section further including a pair of optical conductors seated by said strength members and spaced from one another by said strength members, said optical conductors each having an optically conductive core with at least each optical conductor having a resilient sleeve about its core, said strength members being larger than said optical conductors, in a plane normal to the axis of said cable said central section being generally symmetrical about each of a pair of angularly displaced planes, each of said optical conductors engaging both of said strength members and extending substantially to the periphery of said central section; and a section including a plurality of electrical conductors surrounding said central section.

* * * * *